United States Patent [19]

Armstrong et al.

[11] Patent Number: 5,711,146

[45] Date of Patent: Jan. 27, 1998

[54] HYDROGEN PEROXIDE DECOMPOSITION

[75] Inventors: Warren E. Armstrong, Lafayette; Alfred J. L. Toombs, Berkeley, both of Calif.

[73] Assignee: Shell Oil Company, Houston, Tex.

[21] Appl. No.: 416,685

[22] Filed: Dec. 4, 1964

[51] Int. Cl.[6] .............................. C06D 5/04; C21C 5/02; C01F 7/34

[52] U.S. Cl. .......................... 60/218; 60/219; 23/305 R; 252/183.14; 75/314

[58] Field of Search .................. 60/218, 129; 252/472, 252/183.14; 23/207, 305 R; 75/172

[56] References Cited

U.S. PATENT DOCUMENTS

| | | | |
|---|---|---|---|
| 2,791,883 | 5/1957 | Moore | 149/87 X |
| 3,055,840 | 9/1962 | Koch | 252/472 |
| 3,212,255 | 10/1965 | Putt | 60/218 |

*Primary Examiner*—Peter A. Nelson

[57] ABSTRACT

A method for decomposing hydrogen peroxide which comprises contacting the hydrogen peroxide with a catalyst having a surface consisting of a mixture of ruthenium with at least one metal of the group consisting of iridium and platinum in which the ruthenium is about 20 to about 70 atom percent of said metals.

8 Claims, No Drawings

HYDROGEN PEROXIDE DECOMPOSITION

This invention relates to the decomposition of hydrogen peroxide to produce steam and oxygen. It deals with new and improved catalysts for this decomposition.

Solid silver catalysts are generally considered the most advantageous among the numerous catalysts known to be effective in promoting the decomposition of hydrogen peroxide. These silver catalysts have had the disadvantage, however, of having only a relatively short, effective life due to their rapid loss of silver during use. This is an especially serious problem in reaction motors, control devices for rockets, and the like, where it is highly desirable to use the smallest possible amount of hydrogen peroxide decomposition catalyst yet insure a long, effective life in repeated use. Further, silver catalysts are not satisfactory for decomposition of hydrogen peroxide of more than about 93% concentration because of the loss in strength which silver undergoes at the high adiabatic decomposition temperatures which are produced with the more concentrated peroxide.

A new type of catalyst has now been found which gives advantageous results in the decomposition of hydrogen peroxide and can be successfully used for decomposing hydrogen peroxide of 95% weight and higher concentration. These new catalysts have a surface consisting of a mixture of ruthenium with iridium and/or platinum in which the ruthenium is about 20 to about 70 atom percent of these metals. Especially useful catalysts are those which contain about 25 to about 65 atom percent of ruthenium with about 75 to about 35 atom percent iridium. All the new catalyst mixtures are highly active and give efficient decomposition of hydrogen peroxide at low temperatures. This makes them especially useful in monopropellant thrust chambers, particularly to provide attitude control effects in high altitude or space vehicles using hydrogen peroxide of 90% or higher concentration.

The new hydrogen peroxide decomposition catalysts can be used in various forms. One suitable form is as a ruthenium plus iridium and/or platinum surface of the specified proportions on wire screens of the conventional type used in beds of the usual silver catalysts. For example, a wire mesh fabrication of transversely woven copper or nickel wire strands can be plated with the mixture of metals of the invention. Most advantageously the plating is carried out using the known methods for insuring the deposition of the metal mixture in nodular or other rugose surface form. In this way catalyst mixture with increased over-all surface area-to-volume is obtained whereby improved catalyst performance is achieved.

Any suitable means may be employed for plating the base metal with the mixture of ruthenium plus iridium and/or platinum used in the invention. Thus vapor deposition procedures can be used but because of the high temperatures which they involve it is generally more convenient to apply electroplating methods. Alternatively, catalyst wires can be made by drawing from a bar of the metal mixture of the required proportions although the metal cost will be higher as a rule when this method of manufacture is employed. Pure drain wire, however, will be more suitable for the higher thermal stress imposed by the decomposition of 98% hydrogen peroxide, for example.

Whether made exclusively of the catalyst mixture or plated therewith on a base metal of lower cost, the catalyst wires intended for use in screens are preferably of about 0.01 to about 0.04 inch in diameter and are advantageously woven so as to provide a fractional free area of about 0.3 to 0.4. Catalyst beds with many advantages can be fabricated from these screens by superimposing them, preferably with interspersed supporting screens of more rigid metal, e.g. stainless steel, or the like.

More active catalysts can be made by depositing the previously described mixtures of catalyst metals on a porous support so the mixture of catalyst metals represents about 0.1 to about 35% of the total weight of said catalyst mixture and said support. A special feature of the present invention is the use of these catalyst mixtures with stable supports which have a surface area of at least 3 square meters per gram. Suitable supports of this kind can be made from alumina, particularly activated alumina, diatomaceous earths, kieselguhr and like siliceous materials, silica gels, silica-alumina gels, and the like, porous clays, particularly those of the bentonite type, titanium dioxide, calcium carbonate, barium sulfate, and the like when prepared in the known way to provide the required surface area. The supports of this type which are stable under hydrogen peroxide decomposition conditions are especially useful. This is particularly the case with certain aluminas which combine desirable thermal stability with good activity of the combined iridium-ruthenium or ruthenium-platinum metals used therewith. These aluminas are characterized by moderate surface area, preferably in the range 3–200 square meters per gram. Such aluminas may be prepared by sintering or bonding fine powders obtained by grinding fused alumina of alpha or corundum structure. They may also be prepared by controlled calcination of precipitated aluminum oxides or hydrated oxides. Especially suitable carriers are, for example, "Alundums" of 6–70 $m^2/g$ surface area such as are made by the Norton Company of Worchester, Mass.

There are special advantages in using for the support a refractory material having a pore volume of at least 0.1 cubic centimeter per gram and a specific surface area, measured in square meters per gram, equal to or greater than 95 ($C_p$+ 0.013+0.62 $V_p$) where $C_p$ is the specific heat capacity of the carrier at about 25° C. in calories per gram per degree, and $V_p$ is the pore volume of the carrier in cubic centimeters per gram. Refractory inorganic oxides of this type are particularly advantageous for use with the catalyst metal mixtures of the invention. Especially effective are supports of this kind which have a surface area of about 100 to 300 square meters per gram and a pore volume of about 0.3 to about 0.5 cubic centimeter per gram. By suitable treatment, supports meeting these requirements can be produced from various of the foregoing starting materials, but as a rule the most suitable supports will be the aluminas which have crushing strengths between about 10 and about 30 pounds per equivalent ⅛-inch diameter pellet.

The porous support used preferably has a particle size between about 2 and about 20 mesh. Pelleted or other shaped forms of support material can be used as well as porous powders. Convenient pellet sizes range from ¹⁄₁₆ inch to ½ inch.

The catalysts can be prepared in various ways. One suitable method comprises impregnating the chosen porous support with a solution of salts of the combination of ruthenium, iridium and/or platinum metals which are to be present in the final catalyst. The impregnation can be carried out by adding to the porous support enough solution to fill the pores, then drying and calcining. Better results are usually obtained, however, by soaking the porous particles in an excess of solution from which the required amount of the salt mixture is adsorbed by the support, after which the porous support is dried and then calcined as before. It is advantageous to evacuate the support before adding the solution as faster and more complete impregnation can then be obtained. Solutions of the mixture of platinum group metal salts may be made up in water, alcohol, or other suitable solvents.

Any soluble salts of iridium or ruthenium or platinum can be employed in making the catalysts. Those which can be decomposed to the metal by heating at a temperature below about 1000° C. are preferred. Chlorides, nitrates and the like are examples of suitable salts. It is not necessary that the mixture of salts of the metals used all have the same anions. Iridium chloride can be used with platinum nitrate or ruthenium nitrate with platinum chloride, for example. As a rule, solutions of the chosen mixture of salts which contain about 0.001 to about 0.1 gram of total platinum group metal per milliliter are advantageous. Thus especially active hydrogen peroxide decomposition catalysts have been obtained by impregnating porous support material of the required surface area with solutions containing chlorides of the chosen metals in amounts corresponding to about 0.01 to 0.04 gram total of these metals per milliliter in aqueous hydrogen chloride of about 0.8 to about 1.2 normality.

Still other methods of catalyst preparation can be employed. But whatever method is used, one generally obtains catalysts of most useful activity by depositing about 0.1 to about 35% wt of total active catalyst metal on the porous support.

The porous support containing the solution of mixed platinum group metal salts is dried by heating in air or in a stream of other suitable gas. Drying and partial decomposition temperatures of about 90° to about 400° C. are suitable. The impregnation and drying can be repeated one or more times when it is desirable to use larger amounts of platinum group metals in the catalyst.

The dried impregnated support is then heated, preferably in a stream of hydrogen or inert gas to decompose the platinum group metal salts present therein. Calcining at about 400° to about 1000° C. for about ¼ to about 5 hours is usually adequate.

A particularly advantageous method of catalyst production involving multiple impregnations of the porous support which can be applied in making catalysts for hydrogen peroxide decomposition in accordance with the present invention is described and claimed in copending application of Armstrong-Ryland-Voge, Serial No. 371,879, filed May 28, 1964, the disclosure of which is incorporated herein by reference.

The supported granular catalysts can be used for hydrogen peroxide decomposition in a manner similar to that in which the screen form of the catalyst can be employed. A bed of the catalyst can be advantageously used in a reaction chamber having an inlet for hydrogen peroxide at one end and an outlet for the products of the decomposition at the other end with the catalyst positioned therebetween so the hydrogen peroxide must pass therethrough. U.S. Pat. No. 2,865,721 describes one suitable arrangement in which the new type catalyst of the invention can be employed with advantage.

The new catalysts can be used alone or in combination with other catalysts for the decomposition of hydrogen peroxide. An advantageous arrangement is to use the new catalyst at the inlet end of the decomposition reactor where it will be contacted first by the incoming peroxide and to following the new catalyst by the other catalyst or catalysts to be employed. Conventional silver catalyst can be successfully used in this way with the new decomposition catalysts for decomposing hydrogen peroxide of 90% concentration or less. Usually about one-tenth to about one-fourth of the total catalyst will be the ruthenium with iridium and/or platinum catalyst. U.S. Pat. No. 2,721,788 describes a suitable form of reactor in which the new catalysts can be used with or without conventional hydrogen peroxide decomposition catalyst.

The following examples illustrate methods of applying the process of the invention and show some of its advantages.

EXAMPLE I

A scaled-down rocket motor used by the Naval Air Rocket Test Station as a hydrogen peroxide decomposition evaluator was employed for tests of the process of the invention, employing a catalyst bed ⅝ inch in diameter by 3.4 inches in depth. In a typical series of tests the catalyst was composed of iridium and ruthenium on rounded pellets of aluminum about ⅛ inch in diameter. The aluminum support had a specific heat capacity at 25° C. of 0.185 calorie per gram per degree, and a specific surface area of 36 square meters per gram. The catalyst was made by immersing 200 grams of the aluminum support in an aqueous HCl solution of $H_2IrCl_6$, and $RuCl_3$ proportioned so as to provide 0.03 gram of iridium and 0.03 gram of ruthenium per cubic centimeter. The support took up 90 cubic centimeters of this solution, after which the water was evaporated off and the salts partially decomposed at about 380° C. in air. The catalyst was cooled to room temperature. The absorption of iridium and ruthenium followed by drying and decomposing in the same manner was repeated seven times until the catalyst contained 15% wt of ruthenium and iridium with the ruthenium present as 67 atom percent and the iridium as 33 atom percent of the catalyst metals. The final catalyst was deduced under a flow of hydrogen at 550° C. for ½ hour, then cooled to room temperature in nitrogen.

After a preliminary ten minutes of operation, during which the flow rate of the 90% wt hydrogen peroxide was varied downward to the point of steady operation at about 0.08 gallon per minute, measurements of operating temperatures and pressures were made with the following results:

| Time of Operation, | Temperature, °C. | | Pressure, psia | |
|---|---|---|---|---|
| minutes | Inlet | Outlet | Inlet | Outlet |
| 10 | 26 | 730 | 104 | 40 |
| 20 | 26 | 730 | 100 | 29 |
| 25 | 26 | 725 | 97 | 26 |

The catalyst continued to have good activity and decomposition was excellent throughout the tests. In contrast to these results, a catalyst made using only $RuCl_3$ was only moderately active in hydrogen peroxide decomposition.

EXAMPLE II

Tests were carried out as in Example I but using a catalyst containing ruthenium, iridium and platinum on alumina-silica support in the form of rough spheres of about ¹⁄₁₆-inch diameter. The support had a specific surface area of 180 square meters per gram and the three catalyst metals were present in a total amount of 19% wt with atomic percentages of ruthenium, iridium and platinum of 63%, 34% and 3%, respectively. Temperature and pressure measurements made at different flow rates of 90% hydrogen peroxide show the high activity of the catalyst under these conditions.

| Hydrogen Peroxide | Temperature, °C. | | Pressure, psia | |
|---|---|---|---|---|
| Flow Pate, GPM | Inlet | Outlet | Inlet | Outlet |
| below 0.10 | 29 | 660 | — | 60 |
| 0.10 | 29 | 725 | — | 80 |
| 0.12 | 29 | 737 | 134 | 75 |
| 0.13 | 29 | 738 | 188 | 80 |
| 0.14 | 29 | 740 | 130 | 85 |

EXAMPLE III

In another test of a ruthenium plus iridium catalyst carried out as in Example I, these metals were used in a total amount of 30% wt on an alumina support which had a specific heat capacity at 25° C. of 0.185 calorie per gram per degree, a pore volume of 0.29 cubic centimeter per gram, and an average crushing strength of 9 lbs per ⅛-inch pellet. The proportions of ruthenium to iridium were 17 atom percent to 83 atom percent respectively. High activity over extended periods of test was obtained, the results being superior to those obtained in similar tests with catalysts having either of the two metals alone.

EXAMPLE IV

In tests with catalyst in the form of screens good results can also be obtained with screens made by electroplating ruthenium and iridium on nickel screens as follows. Nickel wire mesh screen stock is degreased, using a solvent such as tetrachloroethylene and then cleaned in an alkali bath, for instance with Oakite No. 24. The screen stock is water-rinsed and then activated in an acid nickel chloride solution containing 32 oz nickel chloride per gallon and 11 fluid oz hydrochloric acid per gallon. This solution is brought to a temperature 70° F., and a current density of 30 a.s.f. is applied; the electrodes being of nickel metal. The tank is preferably rubber-lined. The workpieces are connected to the anode terminal, for approximately two minutes, and then the current is reversed to make the workpieces cathodic for approximately six minutes or in the alternative the workpieces may be soaked in the solution for about 15 minutes without reversing the current flow. The workpieces are then again water-rinsed thoroughly.

The screen stock is then placed in a plating tank containing potassium ruthenium cyanide (double salt) and potassium iridium cyanide (double salt) in concentrations of about 3 oz and 4 oz per gallons, respectively, together with potassium cyanide, 4 oz per gallon; dipotassium sulfate, 4 oz per gallon; and potassium carbonate, 2 oz per gallon. This solution is used at a temperature between 20°–27° C., and under a voltage between 2–4 volts with a current density between 3–15 amperes per square foot. The tank is preferably plastic-or rubber-lined and the anodes are of stainless steel. First, with the current on, the workpieces are immersed in the bath and initially from 4–6 amperes square foot are applied for approximately 1–1½ hours. This provides a deposit layer of approximately 0.0015 inch thick. The workpieces are then cold-water-rinsed, and then hot-water-rinsed, and are then dried by blowing clean air or oven-dried air thereover for approximately ½ hour at 212° F.–220° F.

In this way screens having a surface mixture of ruthenium and iridium in about equal atom percentages are obtained. These are effective hydrogen peroxide decomposition catalysts when used in stacked wire mesh disc form of catalyst bed although they are less active than the previously described ruthenium-iridium catalysts on granular porous supports.

It will thus be seen that the new method of hydrogen peroxide decomposition offers many advantages. It is not limited to the examples which have been given by way of illustration since other modifications can be successfully employed. Nor is the invention restricted by any theory proposed in explanation of the improved results which are obtained.

We claim as our invention:

1. In a method for the catalytic decomposition of hydrogen peroxide to steam and oxygen and the production of thrust in a thrust chamber, the improvement which comprises contacting the hydrogen peroxide with a supported or unsupported catalyst having a catalytic surface consisting of a catalyst mixture of ruthenium with at least one metal of the group consisting of iridium and platinum in which the ruthenium is about 20 to about 70 atom percent of said metals.

2. A method in accordance with claim 1 wherein the metals are ruthenium and iridium.

3. A method in accordance with claim 2 wherein the ruthenium is about 25 to about 65 atom percent of the ruthenium and iridium present.

4. A method in accordance with claim 1 wherein the metals are ruthenium and platinum.

5. A method in accordance with claim 1 wherein said catalyst mixture is carried on a porous support and represents about 0.1 to about 35% of the total weight of said catalyst mixture and said support.

6. A method in accordance with claim 1 wherein the porous support has a pore volume of at least 0.1 cubic centimeter per gram and a specific surface area, measured in square meters per gram, up to 300 and equal to or greater than 95 $(C_p+0.013+0.62\ V_p)$ where $C_p$ is the specific heat capacity of the carrier at about 25° C. in calories per gram per degree, and $V_p$ is the pore volume of the carrier in cubic centimeters per gram.

7. A method in accordance with claim 6 wherein the support is a refractory inorganic oxide having a surface area of about 100 to 300 square meters per gram and a pore volume of about 0.3 to about 0.5 cubic centimeter per gram.

8. A method in accordance with claim 7 wherein said support is alumina having a crushing strength of about 10 to about 30 pounds.

* * * * *